3,260,467
STRAIGHT THROUGH FLUID ENERGY
PULVERIZERS
Walter Twist, Billingham, Harold Edward Haigh, Norton, and John Ball, Stockton-on-Tees, England, assignors to British Titan Products Company, Limited, Durham, England, a corporation of the United Kingdom
Filed Dec. 24, 1963, Ser. No. 333,047
Claims priority, application Great Britain, Jan. 2, 1963, 322/63
17 Claims. (Cl. 241—5)

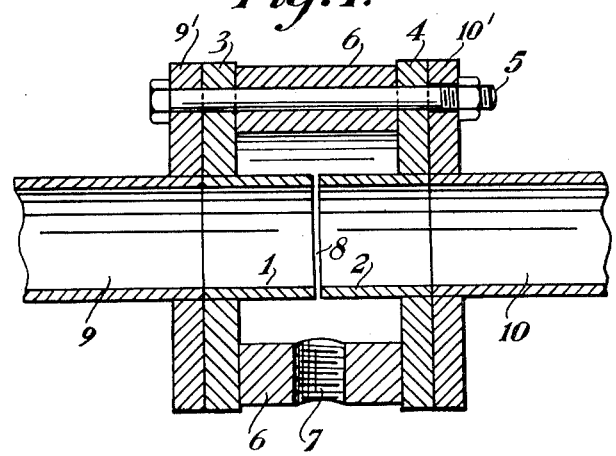
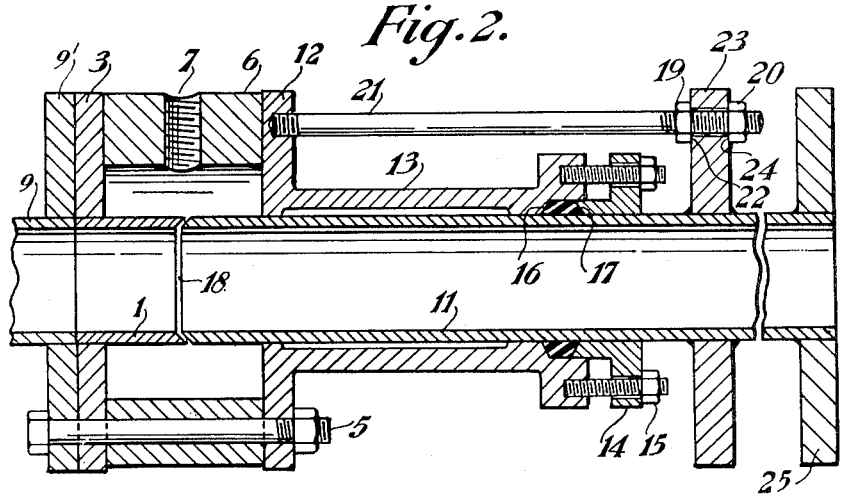

The present invention relates to improved apparatus and processes for the fluid energy pulverizing of particulate solids.

Apparatus which has hitherto been used on a commercial scale for fluid energy pulverizing suffers from several disadvantages. For example, it is difficult to clean such equipment and this is a particular disadvantage when the apparatus is used to pulverize a succession of different materials which may necessitate the cleaning of the apparatus between its use with each material. In some cases, for example in the food industry, it may even be necessary to sterilize the apparatus before use and this may present considerable difficulties in previously used apparatus.

Additionally, the external dimensions of previously used apparatus and the necessity for firm foundations have somewhat limited the flexibility in the use of these devices, for example it may be difficult to install additional pulverizers due to limited space.

It is an object of the present invention to provide an apparatus suitable for fluid energy pulverization of particulate solids which avoids some or all of the disadvantages mentioned above.

It is a further object of the invention to provide a novel process for the fluid energy pulverization of particulate solids.

According to the present invention, there is provided a process for pulverizing particulate solids comprising causing said solids to flow in a confined stream and injecting into the stream a fluid under pressure, the injection being effected from substantially the whole of the periphery of a cross-sectional plane of said confined stream.

The present invention also provides an apparatus suitable for such fluid energy pulverization of particulate solids comprising two conduits aligned in end to end relationship, substantially the whole of the perimeters of the adjacent ends of the conduits being spaced apart, and means to direct inwardly between the adjacent ends a fluid under pressure.

The conduits are preferably separate from each other but it is possible to produce a device falling within the scope of this invention from a single conduit by cutting an aperture of a required width around substantially the whole of the perimeter of the conduit. If, desired, in such a structure, the aperture may be interrupted by leaving a small piece or pieces of the conduit wall uncut, for example to form small distance pieces between the sides of the aperture. This method, however, is not preferred since the particulate solid to be pulverized may accumulate behind such pieces of the conduit wall and thus remain unpulverized.

The fluid under pressure may suitably be passed into the conduits from a manifold located around their adjacent ends, there also being provided means for feeding into the manifold the said fluid under pressure. In this case the parts of the conduit to either side of the aperture would be considered as providing the aforesaid conduits.

The conduits are conveniently straight pipes of circular cross-section and of diameters similar to each other and preferably equal. They may, however, if desired, have an elliptical cross-section or may, if appropriate, be fed by curved supply pipes.

The thickness of the walls of the conduits should be sufficient to resist the pressure of fluid within the conduits and it should also desirably be sufficient to give good direction to the fluid entering the conduit, particularly when adjacent ends of the conduit are formed to direct the fluid in the same general direction as the flow of particulate material. The conduits should also be made from or alternatively lined with material which has satisfactory resistance to any abrasive or corrosive material which may be passed through the apparatus.

It is preferred that the width of the aperture between the adjacent ends of the conduits should be adjustable to allow different quantities of fluid to be introduced into the conduits. One convenient method of achieving this is to form each conduit with a flange around its periphery, suitably at the end remote from the other conduit, and to bolt these flanges to opposite sides of a distance piece of the appropriate length to give the desired aperture width. If the distance piece is of a suitable shape, e.g., of annular cross-section, it may with the two flanges and the exterior of the conduits, form a distribution chamber or manifold into which the fluid may be introduced before entering the aperture between the conduits. Such a device is shown in FIGURE 1 of the accompanying drawing.

Another method of providing an adjustable aperture between the conduits is to provide one conduit with a manifold structure, the other conduit being movable longitudinally relatively to the first conduit, a fluid-tight gland forming a seal between the manifold structure and the exterior of the other conduit. Means may then be provided for adjusting the distance through which the other conduit protrudes into the manifold structure through the gland, for example by a screw thread or the like. Such a device is shown in FIGURE 2 of the accompanying drawing.

The ends of the conduits limiting the aperture between them may form a plane surface or be of any other desired shape. For example they may be so shaped to give a convergent, divergent or convergent/divergent form to the flow of fluid entering the conduits, as desired.

Suitably they are so shaped as to be capable of imparting a direction of flow to the fluid at an angle of from 45° to 90° to the axis of the conduits. The adjacent ends of the conduits may be formed so as to direct the flow at right angles to the longitudinal axis of the conduits or they may be shaped to direct the flow at an oblique angle to this axis. For example the aperture may be so formed that there is a velocity component in the same direction as the general direction of flow of particulate material through the conduits and in this case some assistance in the movement of the latter through the conduits will be obtained when the compressible fluid is introduced.

A convenient width of the aperture between adjacent ends of the conduits has been found to be in the range of about 0.005 inch to 0.5 inch. When pulverizing titanium dioxide pigment, for example, a convenient width for this aperture has been found to be in the range of about 0.01 inch to 0.1 inch.

The fluid injected into the conduits is preferably steam although other fluids including gases such as air may be used if desired.

The pressure at which the fluid is supplied to the aperture between adjacent ends of the conduits may vary depending, for example, upon the material to be pulverized. In the case of titanium dioxide pigments, steam at pressures in the range of about 20 to 500 p.s.i.g. have been found convenient. It is preferred that the steam should have a level of superheat sufficient to prevent excessive condensation in the device and yet not too high a temperature so as to necessitate an inconvenient amount of cooling of the pigment before bagging.

It is also preferred that the ratio of pressure at the outside of the conduit and the pressure inside the conduit should be in the range of about 1.5:1 to 50:1. If desired, a device such as a suction pump, can be applied to the outlet of the pulverizer to obtain such a ratio of pressures.

The material to be pulverized will generally be injected into the open end of one conduit (i.e. the opposite end to that adjacent to the other conduit) by known means for example by a steam jet passing through a restricted orifice into the conduit. Alternatively, it may be possible to set up the present apparatus in a substantially vertical position and to allow the material to drop into the conduit under the influence of gravity. This method may be particularly effective if the adjacent ends of the conduit are shaped to give the fluid injected a velocity component in the same general direction as that of the flow of the particulate material through the apparatus.

It is preferred that if the adjacent ends of the conduit are shaped to give the velocity component, the angle between the direction of flow of the compressible fluid into the conduit and the central longitudinal axis of the device is not less than 45°.

In the apparatus of the present invention a "curtain" of fluid is formed across the adjacent ends of the conduits and thus all particulate material passing through the conduits must pass through this curtain and be subjected to the pulverizing action caused by the fluid at high velocity forcing the particles into violent contact with each other.

Because of the small size, simplicity of construction and relatively low cost, a large number of the devices may be used to achieve the desired result. For example any number may be used in series without undue demand upon available space.

Additionally, because of the simple form of the device these may be cleaned or sterilized much more easily than previously used apparatus.

FIGURE 1 of the drawing shows an embodiment of the invention in which the conduits are formed with flanges separated by a distance piece and the aperture between adjacent ends of the conduits may be adjusted by replacing the distance piece between the flanges by one of appropriate size or by the use of packing strips or the like, whereas FIGURE 2 shows an apparatus in which the aperture between the conduits is adjusted by a longitudinal movement of one conduit.

In FIGURE 1 two conduits 1 and 2 have affixed thereto annular flanges 3 and 4 respectively, which flanges are provided with coinciding bolt holes through which bolts 5 pass. The bolts may also pass longitudinally through the walls of a cylindrical distance piece 6 whereby the flanges (and therefore the ends of the conduits) may be rigidly maintained at a fixed distance apart. The ends of the distance piece 6 are shaped to form a fluid-tight joint with the inside surface of the flanges.

A screwed inlet 7 is provided in the wall of the distance piece for connection to a pipe for the supply of fluid, for example steam, at high pressure. The fluid so introduced fills a space surrounded by the outer surface of the conduits and the inner walls of the flanges and of the distance piece and then enters aperture 8 between the ends of conduits 1 and 2 thus forming a "curtain" of fluid across the ends of the conduits.

To assemble the apparatus the conduits 1 and 2 are placed protruding into the distance piece 6 with their respective flanges 3 and 4 in contact with opposite ends thereof and with the bolt holes coinciding. The conduits and distance piece are then positioned between flanges 9' and 10' respectively attached to the ends of pipes 9 and 10. Flanges 9' and 10' are also provided with bolt holes which may coincide with those of flanges 3 and 4, and so, after alignment of all the bolt holes, bolts 5 are inserted and tightened to hold all the parts rigidly together.

Material to be pulverized is then introduced into the end of pipe 9, for example by means of a steam injector (not shown) and is recovered in a more finely-divided state from the open end of pipe 10 (or vice versa).

When aperture 8 is to be reduced in width the bolts 5, the conduits 1 and 2 and the distance piece 6 are removed and the distance piece 6 is replaced by a shorter distance piece of the appropriate length. When this aperture is to be increased in width; either another or larger distance piece may be inserted in place of the existing one or, alternatively, packing strips may be introduced between the end or ends of the distance piece 6 and the interior wall of one or both flanges 3 and 4.

In the embodiment shown in FIGURE 2, where parts corresponding to those of the embodiment of FIGURE 1 have the same reference numerals, a manifold structure is attached to conduit 1 comprising flange 3, distance piece 6 and a flange 12 abutting against the end of the distance piece remote from flange 3. In this embodiment conduit 2 of FIGURE 1 is replaced by a conduit 11. This right-hand conduit 11 is longer than conduit 2 of FIGURE 1 and is not attached to flange 12 but passes through it and through an extension 13 of this flange and its attached gland. The latter comprises insert 14 which cooperates with flange extension 13 and which is tightened to the extension by means of bolts 15, thus compressing between surfaces 16 and 17 of the insert and extension respectively a suitable compressible material to form a fluid tight seal on to the surface of the conduit 11.

Movement of conduit 11 and consequent adjustment of the width of aperture 18 between the two conduits (which is formed in this embodiment at an angle of 45° to the longitudinal axis of the device) is effected by first unscrewing bolts 15 sufficiently to relax the pressure on the compressible material of the seal, so that conduit 11 may be moved relatively thereto. Subsequently nuts 19 and 20 on three bolts 21 (of which only one is shown) are loosened and either nuts 19 are screwed on to the face 22 of flange 23 which is fixed to conduit 11 (thus increasing the width of the space between adjacent ends of the conduit) and thereafter nuts 20 tightened on to face 24 of flange 23 to prevent further movement, or nuts 20 are screwed on to the face 24 (to decrease the width of the aperture between the adjacent ends of the conduits) and nuts 19 then tightened on to face 22 to prevent further movement. A further flange 25 is fixed round the end of conduit 11 for the purpose of being secured to a pipe comparable with pipe 10 of FIGURE 1.

*Example*

A device similar to that shown in FIGURE 1 was made from mild steel. The internal diameter of the conduits 2 and 3 was 1.6 inches and the thickness of the wall 0.25 inch. The distance between the inside faces of the flanges was maintained at 2 inches by the distance piece and the flanges were 1 inch thick. Six bolts were used to hold the flanges and the distance pieces and were ⅝th inch diameter.

The ends of the conduits were shaped to form a convergent/divergent aperture which was 0.07 inch wide at the outside tapering to 0.045 inch at a depth of 0.2 inch and thereafter curving outwards to form an aperture around the perimeter of the interior of the conduit 0.05 inch wide.

Steam at 100 p.s.i.g. and 250° C. temperature was introduced into inlet 7 and this was allowed to continue until the unit had been sufficiently heated. Coarse lumps of rutile titanium dioxide from a drier discharge (of about ¼ inch diameter) were introduced at a rate of 1000 lbs. per hour into the open end of conduit 1 by means of a steam injector. Finely-divided titanium dioxide pigment was recovered from the open end of conduit 2 and this, when cooled, was tested for tinting strength (by the Reynold's blue method) and for gloss by means of a "Hunterlab" Distinctiveness of Image Glossmeter.

The pigment thus produced was compared with a pigment from the same base material by milling in a conventional fluid energy mill.

The tinting strength of the pigment produced by the process of the present invention was rated as 1810 and that of the pigment produced in the conventional fluid energy mill as 1750.

Two paints were also compared by ball milling the two pigments for 16 hours in a solution of a short-medium oil length non-drying alkyd resin in a xylene butanol mixture and made up by appropriate additions of the same alkyd resin and a ureaformaldehyde resin to give a dry film composition of 3 parts pigment/2 parts alkyd resin/1 part ureaformaldehyde resin. Films of equal thickness were applied to a glass substrate and after a suitable flash off period were stored at 120° C. for 1½ hours before being tested on the Glossmeter.

The paint prepared from the pigment produced according to the present invention gave a rating of 93.5 and the paint prepared from pigment produced in the conventional fluid energy mill gave an inferior rating of 88.0.

The superiority of the paint prepared from pigment made according to the present invention was clearly evident upon visual examination of the two paints.

What is claimed is:

1. Apparatus for fluid energy pulverization of particulate solids comprising two pipes of circular cross-section and of equal diameter aligned in end to end relationship, substantially the whole of the perimeters of the adjacent ends of the pipes being spaced apart, each of said pipes encompassed by a flange sealably mounted around the periphery of said pipe, said flanges being separated by a distance piece, such that the distance piece, the flanges and the exterior of the pipes form a manifold for fluid under pressure to direct said fluid inwardly between the adjacent pipe ends, and means for admitting into the manifold said fluid under pressure.

2. Apparatus as claimed in claim 1 wherein the adjacent ends of the pipes are separated by from 0.005 inch to 0.5 inch.

3. An apparatus for the fluid energy pulverization of particulate solids comprising, in combination, conduit means for receiving a flow of solids at high velocity and for the maintaining of the flow of said solids therethrough as a confined stream of substantially uniform cross-sectional area, said conduit means having an aperture about 0.01 to 0.1 inch wide around substantially the whole of the perimeter of said conduit means, and means for directing fluid under pressure into said conduit means through said aperture over substantially the whole of a peripheral cross-section of said conduit means.

4. Apparatus as claimed in claim 3, wherein said conduit means is formed from a single pipe having an aperture cut therein around substantially the whole of the perimeter of said single pipe, said fluid-directing means comprising a manifold adapted to receive a fluid under pressure and enclosing said aperture for directing fluid into said conduit means through said aperture.

5. An apparatus in accordance with claim 3 in which said conduit means comprises a plurality of conduits of substantially the same cross-section, which conduits are aligned in end-to-end relationship with adjacent ends spaced apart to divide said aperture and in which said fluid-directing means encompasses said adjacent ends to direct fluid under pressure into said conduit means through the space between said adjacent ends.

6. An apparatus in accordance with claim 5 wherein said fluid-directing means directs fluid under pressure into said conduit means at an angle from about 90° to about 45° to the longitudinal axis of said conduit means.

7. An apparatus in accordance with claim 5 wherein said fluid-directing means is a manifold adapted to receive a fluid under pressure.

8. Apparatus for fluid energy pulverization of particulate solids comprising two pipes of circular cross-section and of equal diameter aligned in end to end relationship, substantially the whole of the perimeters of the adjacent ends of the pipes being spaced apart about 0.01 to 0.1 inch, means to direct inwardly between the adjacent ends a fluid under pressure comprising a manifold located around adjacent ends, there being provided means for admitting into the manifold said fluid under pressure, the adjacent ends of the pipes being shaped between the exterior and the interior thereof such that the fluid under pressure is directed into the pipes at an angle of between 45° and 90° to the axes of the pipes.

9. A process for pulverizing the particulate solids comprising causing said solids to flow in a confined stream of substantially uniform cross-sectional area and injecting into an intermediate portion of said stream a fluid under pressure, the injection being effected from substantially the whole of the periphery of a cross-sectional plane of said confined stream.

10. A process as claimed in claim 9 wherein the confined stream flows substantially vertically downwards, and wherein the fluid under pressure is injected downwardly into the stream at an angle of below 90° but not less than 45° to the direction of the flow.

11. A process as claimed in claim 10 wherein the fluid is injected at a pressure of from 20 to 500 p.s.i.g.

12. A process as claimed in claim 11 wherein the particulate solids are particles of titanium dioxide.

13. A process for pulverizing particles of titanium dioxide comprising causing said particles to flow in a confined stream of substantially uniform cross-sectional area and injecting into an intermediate portion of said stream a fluid under pressure, the injection being effected from substantially the whole of the periphery of a cross-sectional plane of said confined stream.

14. A process as claimed in claim 13 wherein the fluid injected is superheated steam at a pressure in the range of from 20 to 500 p.s.i.g.

15. A process as claimed in claim 14 wherein the ratio of the pressure of the superheated steam to that of the confined stream of titanium dioxide particles is in the range of 1.5:1 to 50:1.

16. An apparatus for fluid energy pulverization of particulate solids comprising a first conduit and a second conduit aligned in end-to-end relationship, substantially the whole of the perimeter of the ends of the conduits being spaced apart about 0.01 to 0.1 inch, said second conduit movable longitudinally relative to said first conduit, and means to direct inwardly between the adjacent ends of said conduits a fluid under pressure, said fluid-directing means comprising a manifold structure attached to said first conduit and a fluid-tight gland forming a seal between said manifold structure and the exterior of said second conduit.

17. Apparatus for fluid energy pulverization of particulate solids comprising two pipes of circular cross-section and of equal diameter aligned in end to end relationship, substantially the whole of the perimeters of the adjacent ends of the pipes being spaced apart, means for varying the distance apart of the two adjacent ends of the pipes, means to direct inwardly between the adjacent ends a fluid under pressure comprising a manifold located around adjacent ends, there being provided means for admitting into the manifold said fluid under pressure, the adjacent ends of the pipes being shaped between the exterior and the interior thereof such that the fluid under pressure is directed into the pipes at an angle of between 45° and 90° to the axes of the pipes.

References Cited by the Examiner

UNITED STATES PATENTS

| | | | |
|---|---|---|---|
| 385,148 | 6/1888 | Stewart | 285—156 X |
| 2,821,346 | 1/1958 | Fisher | 241—39 |
| 2,846,150 | 8/1958 | Work | 241—39 |
| 2,974,886 | 3/1961 | Nagel | 241—39 |
| 2,983,453 | 5/1961 | Bourguet et al. | 241—1 |

ROBERT C. RIORDON, *Primary Examiner.*

J. SPENCER OVERHOLSER, *Examiner.*

D. KELLY, *Assistant Examiner.*